US012009516B2

(12) United States Patent
Shieh et al.

(10) Patent No.: US 12,009,516 B2
(45) Date of Patent: Jun. 11, 2024

(54) FAST CHARGING LITHIUM-ION BATTERY

(71) Applicant: INDUSTRIAL TECHNOLOGY RESEARCH INSTITUTE, Hsinchu (TW)

(72) Inventors: Deng-Tswen Shieh, Hsinchu (TW); Sheng-Fa Yeh, Miaoli (TW); Shih-Chieh Liao, Taoyuan (TW); Ching-Yu Chen, Ji'an Township (TW); Hao-Tzu Huang, Taichung (TW)

(73) Assignee: INDUSTRIAL TECHNOLOGY RESEARCH INSTITUTE, Hsinchu (TW)

(*) Notice: Subject to any disclaimer, the term of this patent is extended or adjusted under 35 U.S.C. 154(b) by 229 days.

(21) Appl. No.: 17/026,021

(22) Filed: Sep. 18, 2020

(65) Prior Publication Data

US 2021/0083279 A1   Mar. 18, 2021

Related U.S. Application Data

(60) Provisional application No. 62/901,814, filed on Sep. 18, 2019.

(30) Foreign Application Priority Data

May 26, 2020   (TW) .................................. 109117553

(51) Int. Cl.
*H01M 4/48* (2010.01)
*H01M 4/36* (2006.01)
(Continued)

(52) U.S. Cl.
CPC .......... *H01M 4/485* (2013.01); *H01M 4/366* (2013.01); *H01M 10/0525* (2013.01); *H01M 2004/021* (2013.01); *H01M 2004/027* (2013.01)

(58) Field of Classification Search
None
See application file for complete search history.

(56) References Cited

U.S. PATENT DOCUMENTS

| 7,803,484 B2 * | 9/2010 | Wu | ........................ H01M 4/525 429/231.95 |
|---|---|---|---|
| 8,034,480 B2 | 10/2011 | Wu et al. | |

(Continued)

FOREIGN PATENT DOCUMENTS

| CN | 1728440 A | 2/2006 |
|---|---|---|
| CN | 101009388 A | 8/2007 |

(Continued)

OTHER PUBLICATIONS

Japanese Notice of Reasons for Refusal for Japanese Application No. 2020-157826, dated Oct. 5, 2021, with an English translation.

(Continued)

*Primary Examiner* — Wyatt P McConnell
(74) *Attorney, Agent, or Firm* — Birch, Stewart, Kolasch & Birch, LLP

(57) ABSTRACT

A fast charging lithium-ion battery includes a positive electrode plate, a negative electrode plate, a separator, and an electrolyte. The positive electrode plate includes a positive current collector and a positive active material layers. The negative electrode plate includes a negative current collector and negative active material layers. The negative active material layers include titanium niobium oxide, lithium titanate, or a combination thereof. The separator is disposed between the positive electrode plate and the negative electrode plate. The electrolyte contacts the positive electrode plate and the negative electrode plate. The negative active material layers have an effective area corresponding to the positive electrode plate. The negative active material layers have a thickness on one surface of the negative current (Continued)

collector. A ratio of the effective area to the thickness is greater than $2 \times 10^5$ mm.

4 Claims, 15 Drawing Sheets

(51) Int. Cl.
*H01M 4/485* (2010.01)
*H01M 10/0525* (2010.01)
*H01M 4/02* (2006.01)

(56) References Cited

U.S. PATENT DOCUMENTS

| | | | |
|---|---|---|---|
| 9,608,292 B2 * | 3/2017 | Gozdz | H01M 10/0525 |
| 10,361,451 B2 | 7/2019 | Nitta et al. | |
| 2008/0020278 A1 | 1/2008 | Schmidt et al. | |
| 2009/0087730 A1 * | 4/2009 | Kondo | H01M 10/0585 |
| | | | 429/161 |
| 2017/0365886 A1 * | 12/2017 | Hoshina | H01M 50/20 |
| 2019/0097271 A1 | 3/2019 | Wang et al. | |
| 2019/0221843 A1 | 7/2019 | Kosaka et al. | |

FOREIGN PATENT DOCUMENTS

| | | |
|---|---|---|
| CN | 105428636 A | 3/2016 |
| CN | 102751488 B | 5/2016 |
| CN | 105552369 A | 5/2016 |
| CN | 103268936 B | 8/2016 |
| CN | 108630933 A | 10/2018 |
| CN | 109950489 A | 6/2019 |
| EP | 1835560 A1 | 9/2007 |
| JP | 5007061 B2 | 8/2012 |
| KR | 10-2018-0023688 A | 3/2018 |
| TW | I270994 B | 1/2007 |
| TW | 201703318 A | 1/2017 |
| TW | I584519 B | 5/2017 |
| WO | WO 2019/187131 A1 | 10/2019 |

OTHER PUBLICATIONS

Extended European Search Report for European Application No. 20196883.1, dated Feb. 1, 2021.

Chinese Office Action and Search Report for Chinese Application No. 202010986246.6, dated Sep. 1, 2021.

* cited by examiner

FAST CHARGING LITHIUM-ION BATTERY

This application claims the benefit of U.S. provisional application Ser. No. 62/901,814, filed Sep. 18, 2019, and Taiwan application Serial No. 109117553, filed May 26, 2020, the subject matters of which are incorporated by reference herein in its entirety.

TECHNICAL FIELD

The disclosure relates in general to a fast charging lithium-ion battery.

BACKGROUND

Currently, the use of the lithium-ion battery is quite popular. The negative material of the general lithium-ion battery is formed of graphite, soft carbon, hard carbon, Si—C or SiOx-C composite material. However, the battery including above-mentioned negative materials has limited fast charging ability (for example, only charging ability of 3 C-5 C), and safety concern occurs due to lithium plating of the lithium-ion battery.

Therefore, it has become a prominent task for the industries to provide a fast charging lithium-ion battery.

SUMMARY

According to one embodiment, a fast charging lithium-ion battery is provided. The fast charging lithium-ion battery includes a positive electrode plate, a negative electrode plate, a separator and an electrolyte. The positive electrode plate includes a positive current collector and positive active material layers. The negative electrode plate includes a negative current collector and negative active material layers. The material of the negative active material layers includes titanium niobium oxide, lithium titanate or a combination thereof. The separator is disposed between the positive electrode plate and the negative electrode plate. The electrolyte contacts the positive electrode plate and the negative electrode plate. The negative active material layers have an effective area corresponding to the positive electrode plate. The negative active material layers have a thickness on one surface of the negative current collector. A ratio of the effective area to the thickness is greater than $2 \times 10^5$ mm.

The following description is made with reference to the accompanying drawings.

DETAILED DESCRIPTION

Figure 1A:
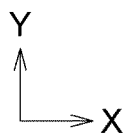
FIG. 1A shows a top view of a positive electrode plate and a negative electrode plate of a fast charging lithium-ion battery according to a first embodiment of the disclosure.
Figure 1A:
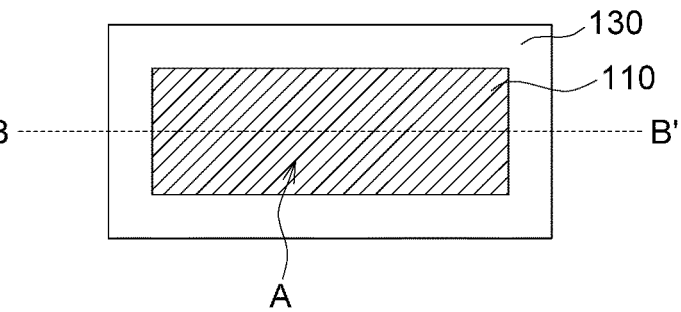
Figure 1B:
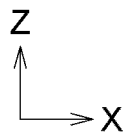
FIG. 1B shows a cross-sectional view along a cross-sectional line B-B' of FIG. 1A according to an embodiment of the disclosure.
Figure 1B:
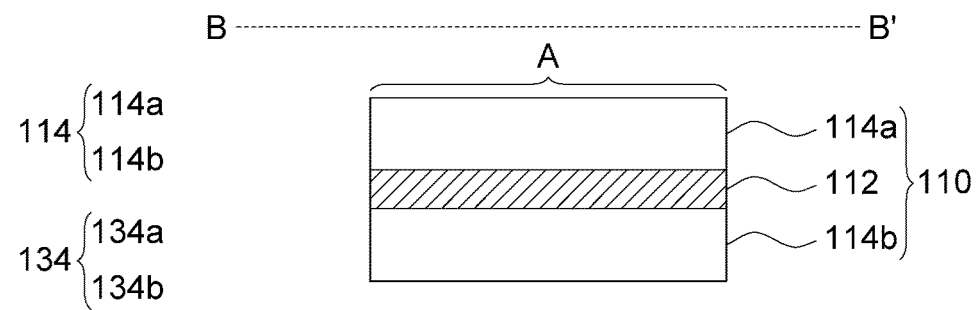
Figure 1B:
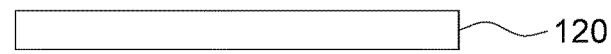
Figure 1B:
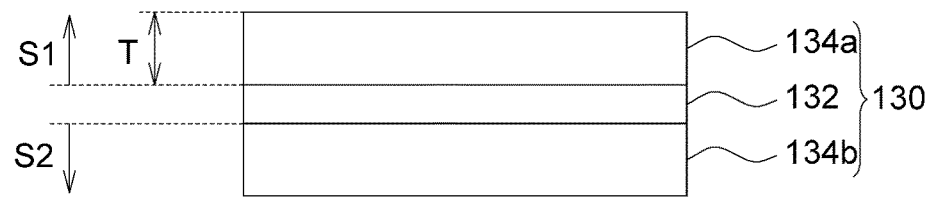

FIG. 1A shows a top view of a positive electrode plate 110 and a negative electrode plate 130 of a fast charging lithium-ion battery 10 according to an embodiment of the present disclosure. FIG. 1B shows a cross-sectional view along a cross-sectional line B-B' of FIG. 1A according to an embodiment.

Referring to FIGS. 1A and 1B at the same time, the fast charging lithium-ion battery 10 includes a positive electrode plate 110, a separator 120 and a negative electrode plate 130. The positive electrode plate 110 includes a positive current collector 112 and positive active material layers 114 disposed on one surface or two surfaces of the positive current collector 112. In the present embodiment, the positive active material layers 114 may include a positive active material layers 114a and positive active material layers 114b. The positive active material layers 114a and 114b may be disposed on two opposite surfaces of the positive current collector 112, but the disclosure is not limited thereto, and the positive active material layers 114 may be disposed on one surface of the positive current collector 112. As indicated in FIG. 1A, the positive active material layers 114a and 114b are exemplarily disposed on two opposite surfaces of the positive current collector 112, but the disclosure is not limited thereto, and the positive active material layers 114 may be disposed on one surface of the positive current collector 112. The negative electrode plate 130 includes a negative current collector 132 and negative active material layers 134 disposed on one surface or two surfaces of the negative current collector 132. In the present embodiment, the negative active material layers 134 may include negative active material layers 134a and the negative active material layers 134b. The negative active material layers 134a and the negative active material layers 134b respectively may be disposed on two opposite surfaces of the negative current collector 132, but the disclosure is not limited thereto, and the negative active material layers 134 may be disposed on one surface of the negative current collector 132. The separator 120 is disposed between the positive electrode plate 110 and the negative electrode plate 130. The fast charging lithium-ion battery 10 further includes an electrolyte (not shown), which contacts the positive electrode plate 112 and the negative electrode plate 132 and separator 120. The positive electrode plate 110 and the negative electrode plate 130 may respectively include an adhesive (not shown) including polyvinylidene difluoride (PVDF) or other suitable materials.

In some embodiments, the material of the positive active material layers 114 may include lithium manganate, lithium cobaltate, lithium nickel cobalt manganate, lithium iron phosphate, lithium iron manganese phosphate, or other suitable positive active materials.

The material of the negative active material layers 134 may include titanium niobium oxide (TNO), lithium titanate (LTO) or a combination thereof. TNO includes a series of compounds, for example, $TiNb_2O_7$, $Ti_2Nb_{10}O_{29}$, $TiNb_{24}O_{62}$, $Nb_2O_5$ and the above-mentioned compounds coated with carbon, and all of them may be used as materials of the negative active material layers. In some embodiments, the negative active material layers 134 may include a combination of titanium niobium oxide and lithium titanate, and the weight percentage of lithium titanate to the negative active material layers 134 may be smaller than 60%.

In some embodiments, the area of a single side of the negative active material layers 134 is the area of the negative electrode plate 130. In general, the area of the negative electrode plate 130 of the lithium-ion battery may be greater than the area of the positive electrode plate 110. That is, the area of a single side of the negative active material layers 134 may be greater than the area of the positive electrode plate 110. In terms of the electrical properties of the lithium-ion battery, the effective area of the single side of the negative active material layers corresponds to the area of the positive electrode plate. In other words, in terms of the present disclosure, the negative active material layers 134 have an effective area A corresponding to the positive electrode plate 110 (i.e. when the negative active material layers 134 are disposed on two surfaces of the negative current collector, the effective area A is twice the area of the positive electrode plate 110). The negative active material layers 134 have a thickness T on one surface S1 (for example, the surface adjacent to the positive electrode plate 110) of the negative current collector 132. In the present embodiment, the negative active material layers 134a and 134b are disposed on the one surface S1 and another surface S2 of the negative current collector 132, respectively. In other words, the thickness T represents the thickness of the negative active material layer 134a or the negative active material layer 134b. For example, the negative active material layers 134a have a thickness T. In some embodiments, the thickness T has a range of 10 μm to 100 μm.

In the present disclosure, the ratio (A/T) of the effective area A to the thickness T is greater than $2×10^5$ mm such as being greater than $2.8×10^5$ mm. In some embodiments, the ratio (A/T) of the effective area A to the thickness T is smaller than $4×10^7$ mm. In some embodiments, the coating of the positive active material layers 114 on the positive current collector 112 may be a single-layer or a multi-layer structure. In some embodiments, the coating of the negative active material layers 134 on the negative current collector 132 may be a single-layer or a multi-layer structure.

The fast charging lithium-ion battery 10 of the present disclosure may control the charging ability by adjusting the ratio (A/T) of the effective area A of the negative active material layers 134 corresponding to the positive electrode plate 110 to the thickness T of the negative active material layers 134. In comparison to the comparison example in which the ratio of effective area to thickness is smaller than $2×10^5$ mm, in an embodiment of the disclosure, the ratio (A/T) of the effective area A of the negative active material layers 134 corresponding to the positive electrode plate 110 to the thickness T of the negative active material layers 134 may be greater than $2×10^5$ mm, such that the electron/ion transmission ability (that is, electrical conduction and electrochemical reaction ability) may be increased, and the fast charging lithium-ion battery 10 may achieve a faster charging rate and a faster discharging rate.

Figure 1C:
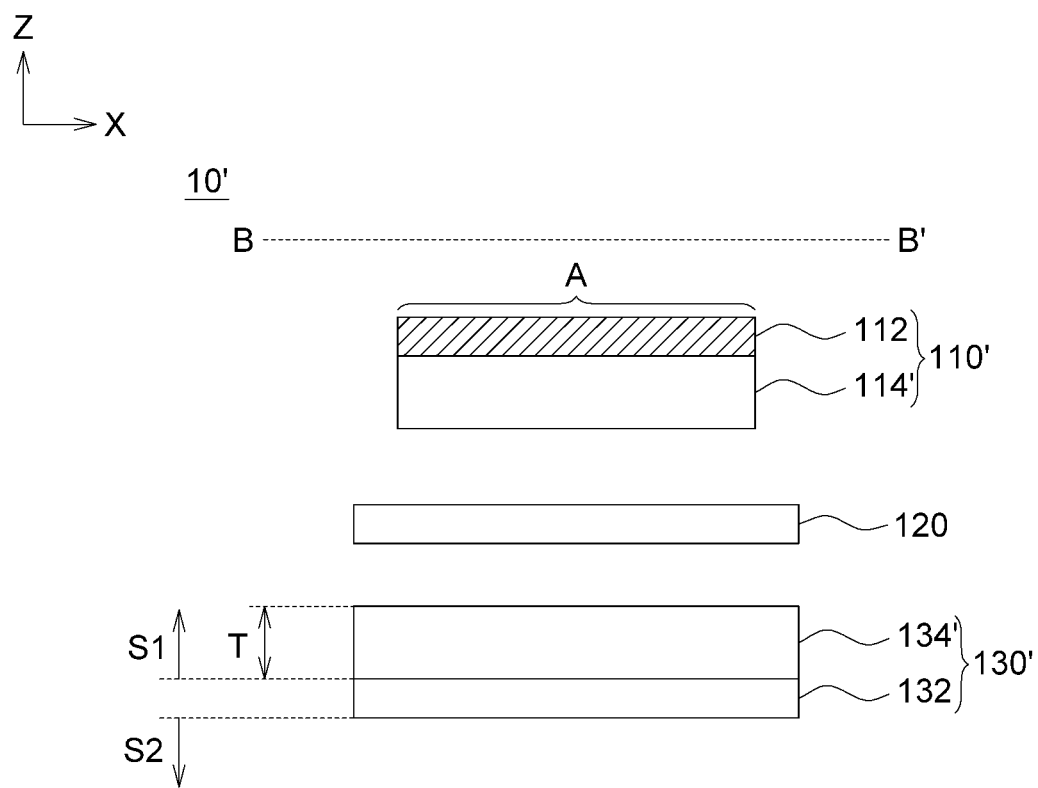
FIG. 1C shows a cross-sectional view along a cross-sectional line B-B' of FIG. 1A according to another embodiment of the disclosure.

FIG. 1C shows a cross-sectional view of a fast charging lithium-ion battery 10' according to another embodiment of the present disclosure. The fast charging lithium-ion battery 10' is different from the fast charging lithium-ion battery 10 in the arrangement of the positive active material layers and the negative active material layers on the positive current collector and the negative current collector, respectively, and similar designations or identical designations are used to indicate similar or identical elements.

Refer to FIG. 1C. In the positive electrode plate 110', the positive active material layers 114' may be coated on one single surface of the positive current collector 112. In the negative electrode plate 130', the negative active material layers 134' may be coated on one single surface of the negative current collector 132. In some embodiments, the positive active material layers 114' and the negative active material layers 134' may be a single-layer or a multi-layer structure.

Detailed descriptions of the disclosure are disclosed below with embodiments. However, the disclosed embodiments are for explanatory and exemplary purposes only, not for limiting the scope of protection of the disclosure.

The fast charging lithium-ion battery was exemplified in comparison example 1 and embodiments 1-6. In the fast charging lithium-ion battery exemplified below, both the positive electrode plate and the negative electrode plate had a double-sided active material layers. In comparison example 1 and embodiments 1-6, all of the positive active material layers included lithium nickel cobalt manganate (for example, nickel:manganese:cobalt=1:1:1), and the width of the positive electrode plate was 55 mm. All of the negative active material layers included titanium niobium oxide, and had a thickness (T) of 38.3 μm. All of the negative electrode plates had a width of 57 mm. All of the separators had a size of 60 mm (width)×16 μm (Thickness). The electrolyte was 1.2M lithium hexafluorophosphate ($LiPF_6$) salt in ethylene carbonate (EC)/dimethyl carbonate (DMC). The adhesive of the positive electrode plate and of the negative electrode plate both included polyvinylidene difluoride (PVDF).

Charge and discharge rates of a battery are controlled by C-rates. For example, C-rate "1 C" means that it takes 1 hour when 1 Ampere current is provided to fully discharge a battery whose capacity is 1 Ah. C-rate "0.5 C" means that it takes 2 hour when 0.5 Ampere current is provided to fully discharge a battery whose capacity is 1 Ah. C-rate "2 C" means that it takes 0.5 hour when 2 Ampere current is provided to fully discharge a battery whose capacity is 1 Ah.

The lengths of the positive electrode plate and the negative electrode plate, the ratio (A/T) of the effective area of the negative active material layers to the thickness of the negative active material layers, and 0.5 C charging/discharging ability used in comparison example 1 and embodiments 1-6 were listed in Table 1.

TABLE 1

| Embodiment | Length of positive electrode plate (mm) | Length of negative electrode plate (mm) | Effective area of negative active material layers (mm$^2$) | Ratio (A/T) of effective area of negative active material layers to thickness of single side of negative active material layers (mm) | Capacity (mAh) |
| --- | --- | --- | --- | --- | --- |
| Comparison example 1 | 50 | 100 | 5500 | $1.44 \times 10^5$ | 100 |
| Embodiment 1 | 100 | 150 | 11000 | $2.87 \times 10^5$ | 217 |
| Embodiment 2 | 150 | 200 | 16500 | $4.31 \times 10^5$ | 324 |
| Embodiment 3 | 200 | 250 | 22000 | $5.74 \times 10^5$ | 412 |
| Embodiment 4 | 400 | 450 | 44000 | $1.15 \times 10^6$ | 880 |
| Embodiment 5 | 500 | 550 | 55000 | $1.44 \times 10^6$ | 1062 |
| Embodiment 6 | 700 | 750 | 77000 | $2.01 \times 10^6$ | 1522 |

FIGS. 2A-2G are diagrams showing the results of charging ability test performed in comparison example 1 and embodiments 1-6.

Figure 2A:
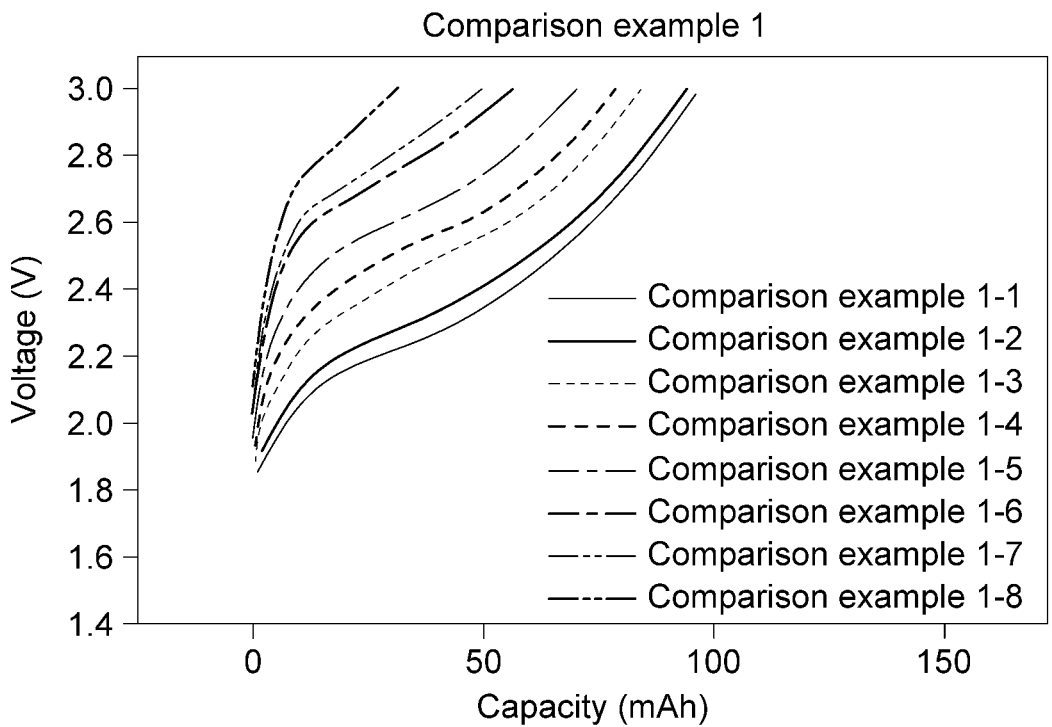
FIGS. 2A-2G are diagrams showing the results of charging ability test performed in comparison example 1 and embodiments 1-6.
Figure 2B:
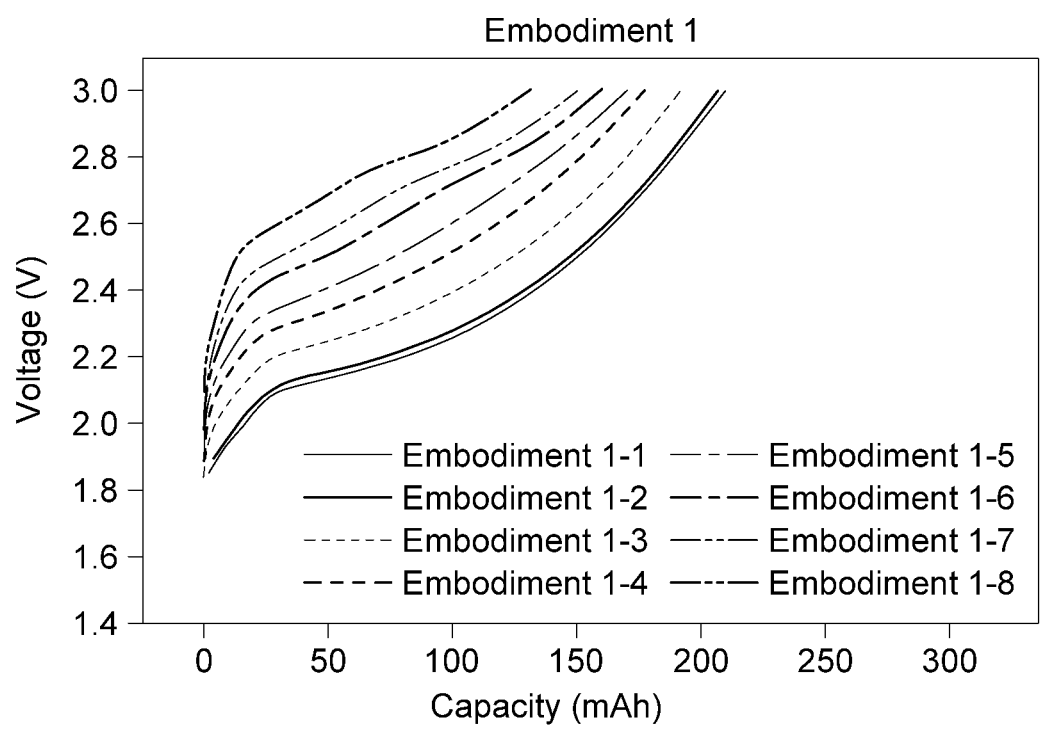
Figure 2C:
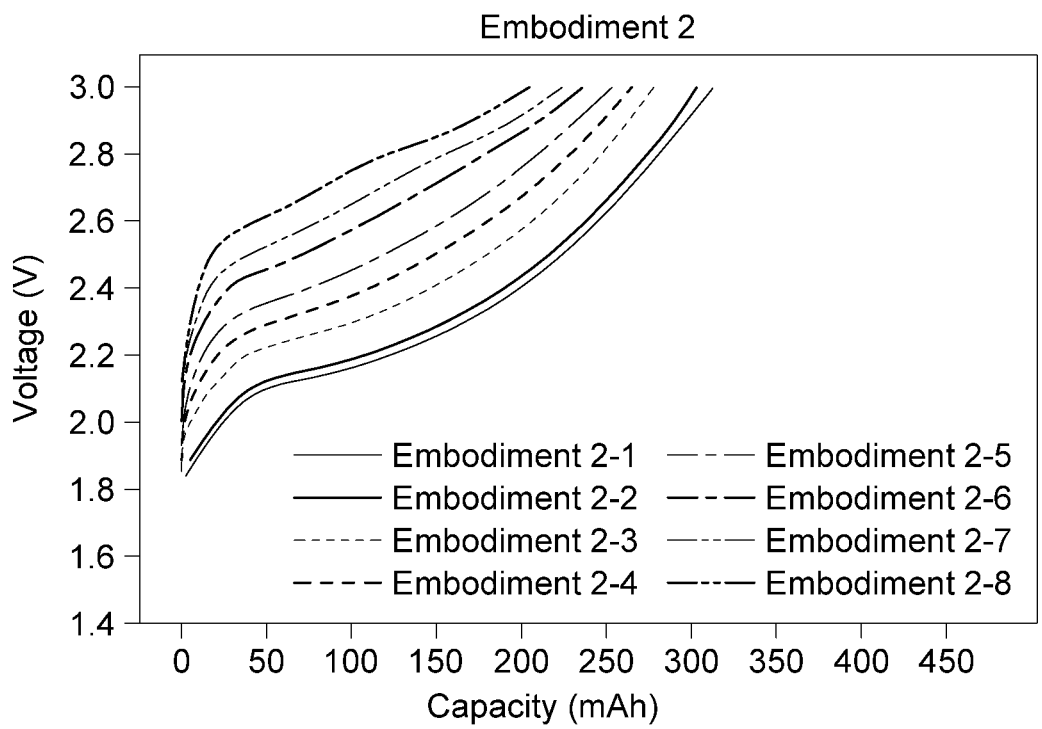
Figure 2D:
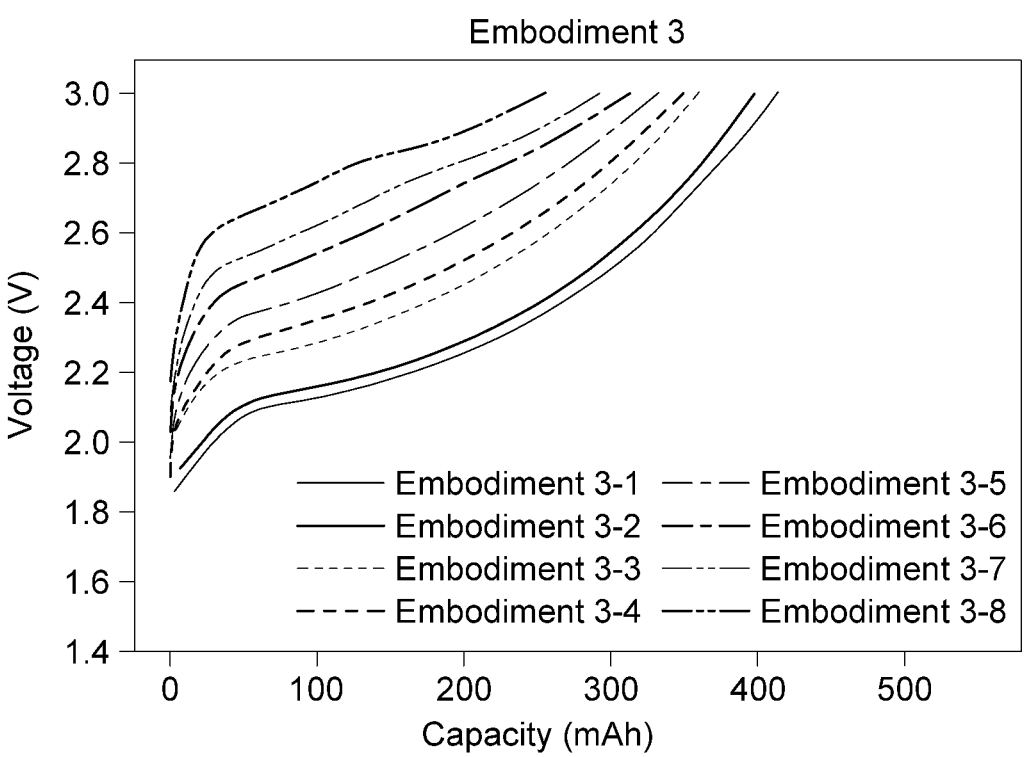
Figure 2E:
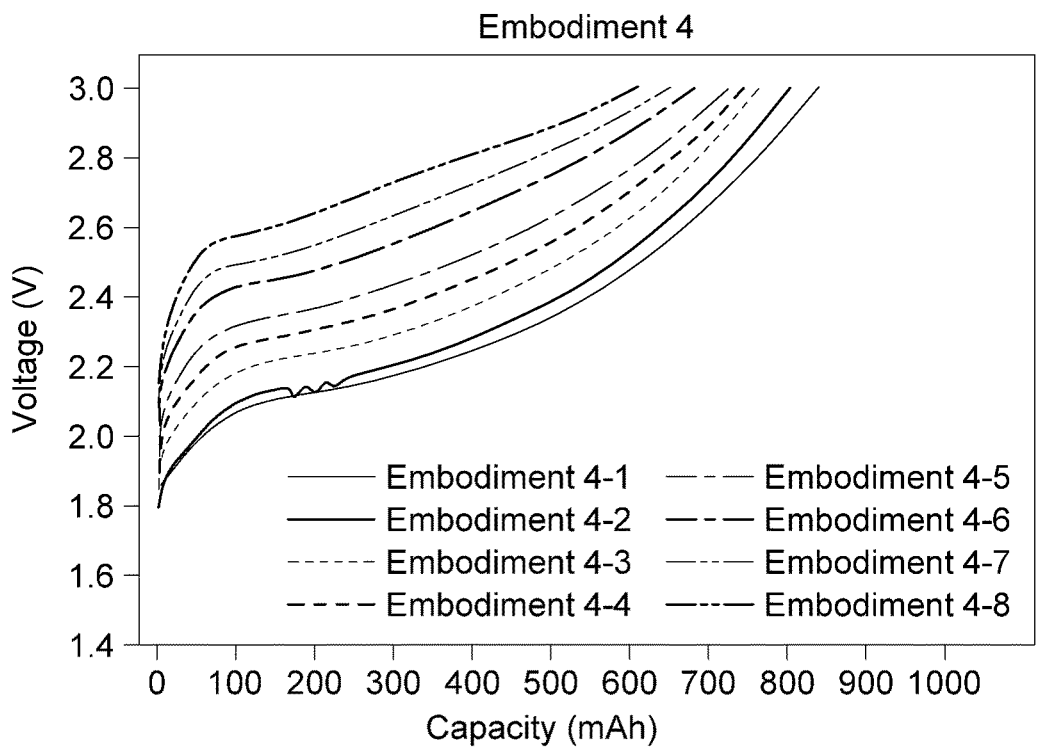
Figure 2F:
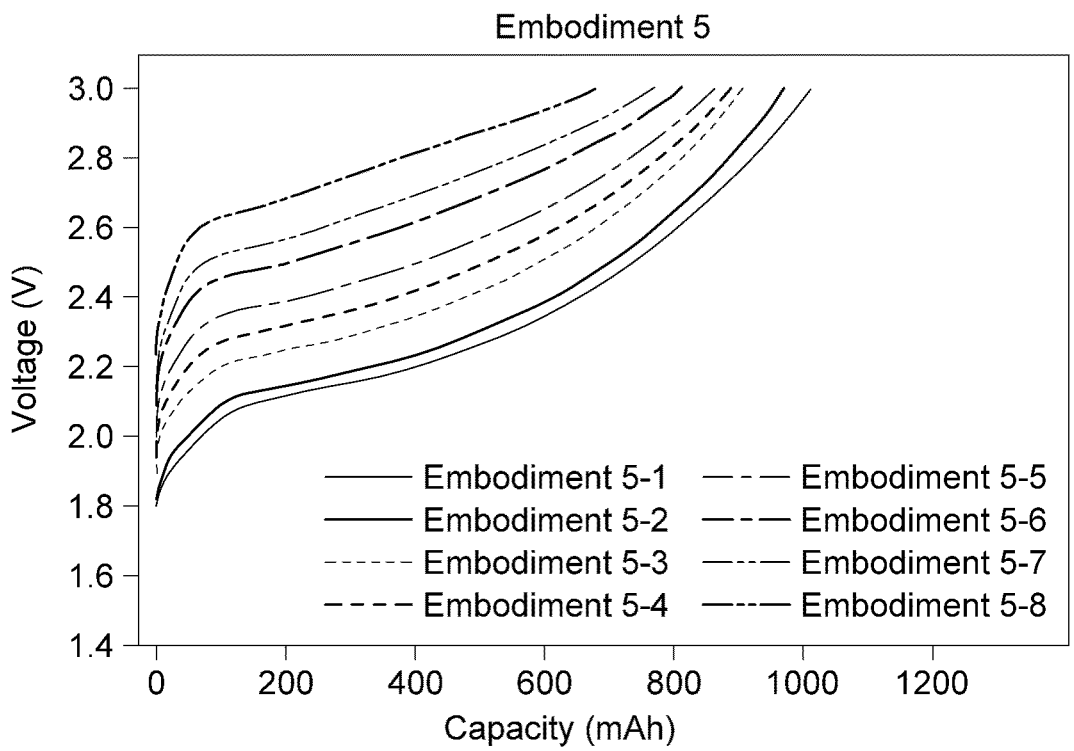
Figure 2G:
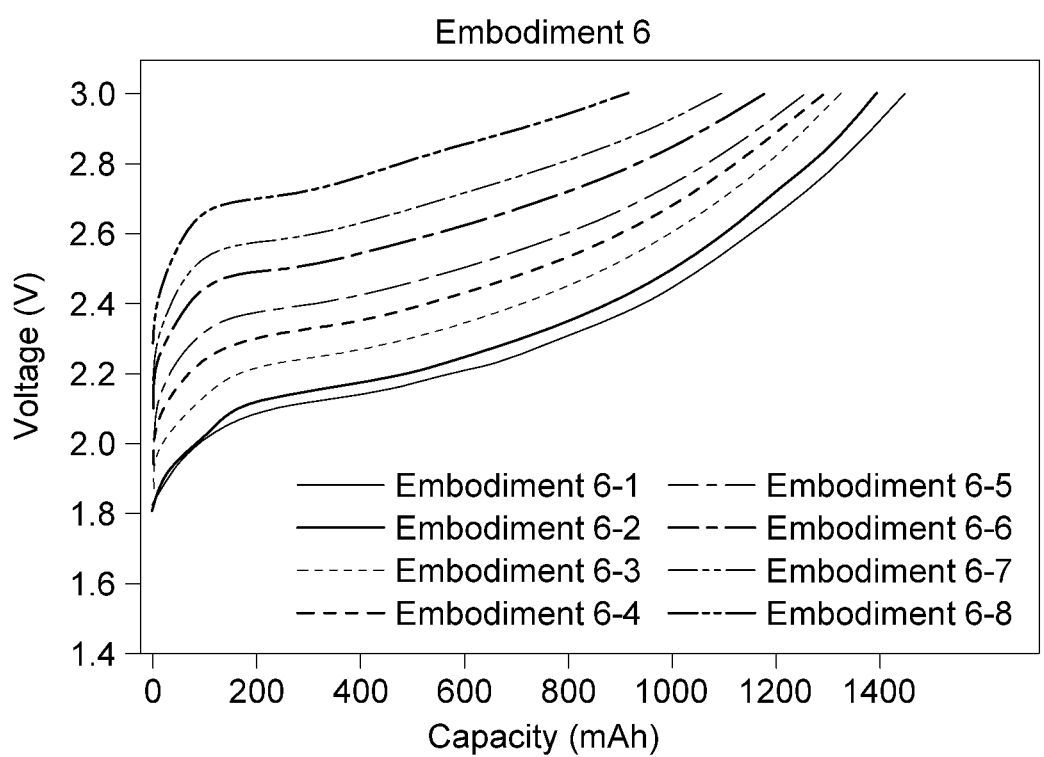

Referring to FIG. 2A, a diagram showing the results of charging ability test performed in comparison example 1 was shown. The X-axis coordinate represented the capacity (mAh), and the Y-axis coordinate represented the voltage (V). In comparison examples 1-1 to 1-8, the same discharging current (such as the discharging current of 0.5 C) was used, but the charging currents (such as the charging currents of 0.5 C to 15 C) were different, and the charging process would stop once the preset voltage (such as 3V) was reached. 0.5 C represented that, in theory, the current value adapted to discharge the fully charged battery in 2 hours. 4 C represented that, in theory, the current value adapted to discharge the fully charged cell in 0.25 (¼) hours. In other words, 4 C represented high-power charging in comparison to 0.5 C. In comparison example 1-1, a charging current of 0.5 C was used. In comparison example 1-2, a charging current of 1 C was used. In comparison example 1-3, a charging current of 3 C was used. In comparison example 1-4, a charging current of 5 C was used. In comparison example 1-5, a charging current of 7 C was used. In comparison example 1-6, a charging current of 10 C was used. In comparison example 1-7, a charging current of 12 C was used. In comparison example 1-8, a charging current of 15 C was used.

Referring to FIGS. 2B-2G, diagrams showing the results of charging ability test performed in embodiments 1 to 6 were shown. Like comparison example 1, in embodiments 1-1 to 1-8, 2-1 to 2-8, 3-1 to 3-8, 4-1 to 4-8, 5-1 to 5-8 and 6-1 to 6-8, the same discharging current (such as the discharging current of 0.5 C) was used, but the charging currents (such as the charging currents of 0.5 C to 15 C) were different, and the charging process would stop once the preset voltage (such as 3V) was reached. In embodiments 1-1, 2-1, 3-1, 4-1, 5-1 and 6-1, a charging current of 0.5 C was used. In embodiments 1-2, 2-2, 3-2, 4-2, 5-2 and 6-2, a charging current of 1 C was used. In embodiments 1-3, 2-3, 3-3, 4-3, 5-3 and 6-3, a charging current of 3 C was used. In embodiments 1-4, 2-4, 3-4, 4-4, 5-4 and 6-4, a charging current of 5 C was used. In embodiments 1-5, 2-5, 3-5, 4-5, 5-5 and 6-5, a charging current of 7 C was used. In embodiments 1-6, 2-6, 3-6, 4-6, 5-6 and 6-6, a charging current of 10 C was used. In embodiments 1-7, 2-7, 3-7, 4-7, 5-7 and 6-7, a charging current of 12 C was used. In embodiments 1-8, 2-8, 3-8, 4-8, 5-8 and 6-8, a charging current of 15 C was used.

FIGS. 3A-3G are diagrams showing the results of discharging ability test performed in comparison example 1 and embodiments 1-6.

Figure 3A:
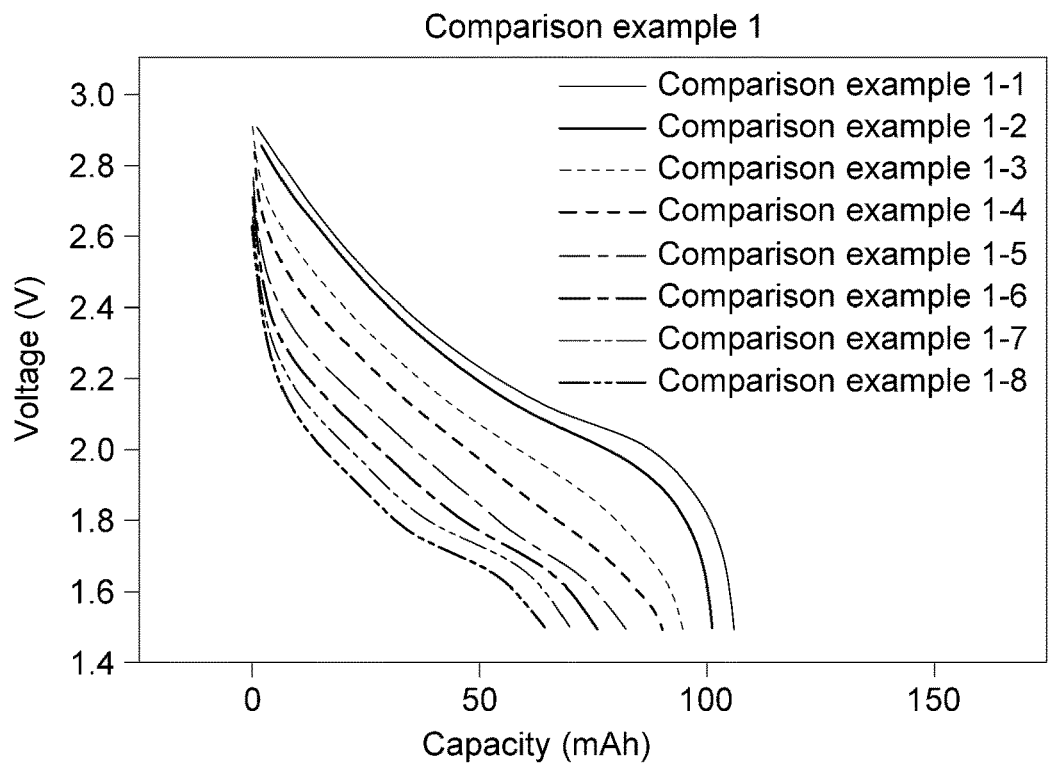
FIGS. 3A-3G are diagrams showing the results of discharging ability test performed in comparison example 1 and embodiments 1-6.
Figure 3B:
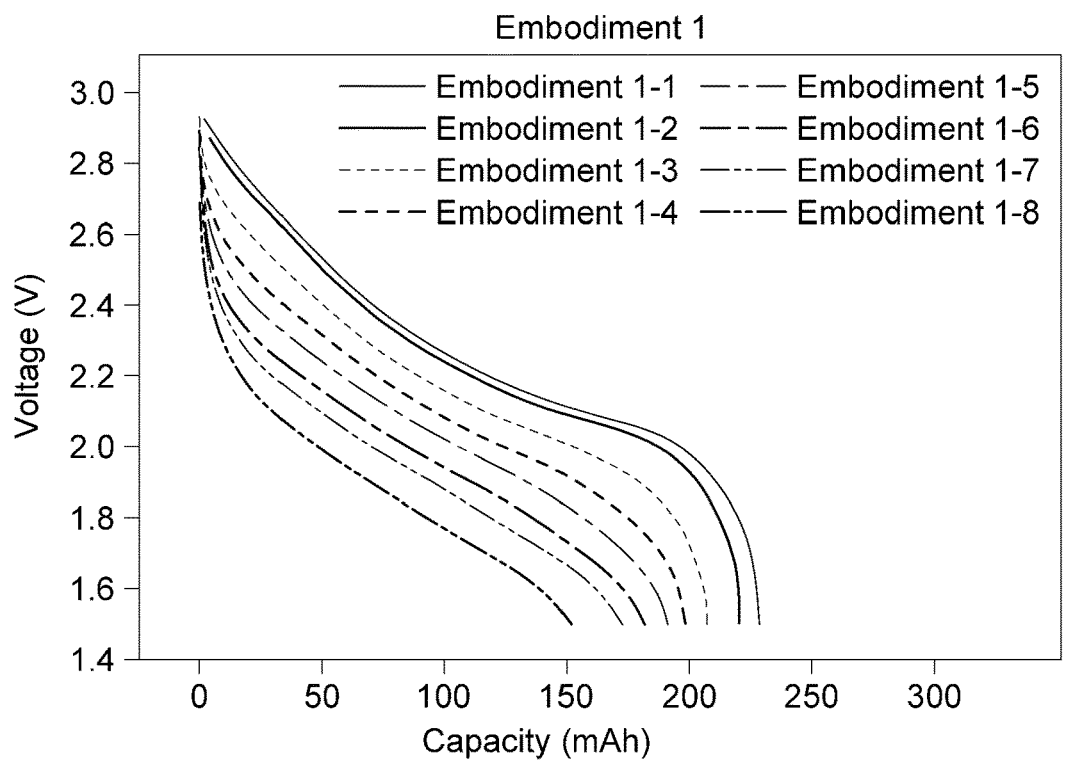
Figure 3C:
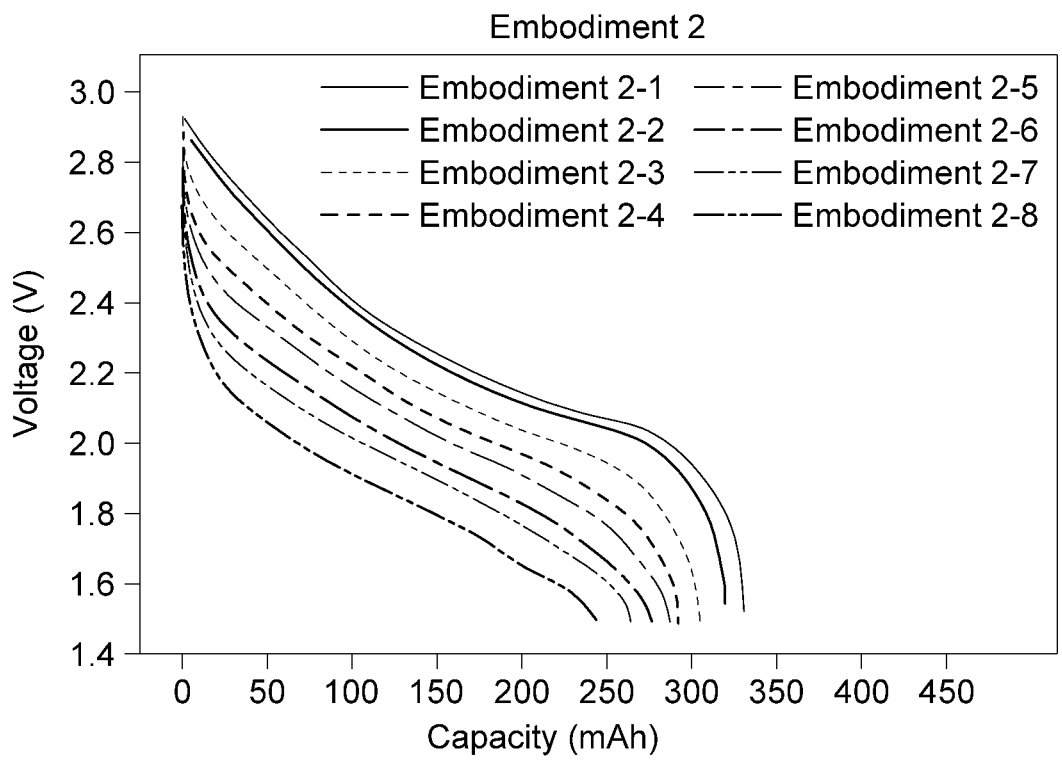
Figure 3D:
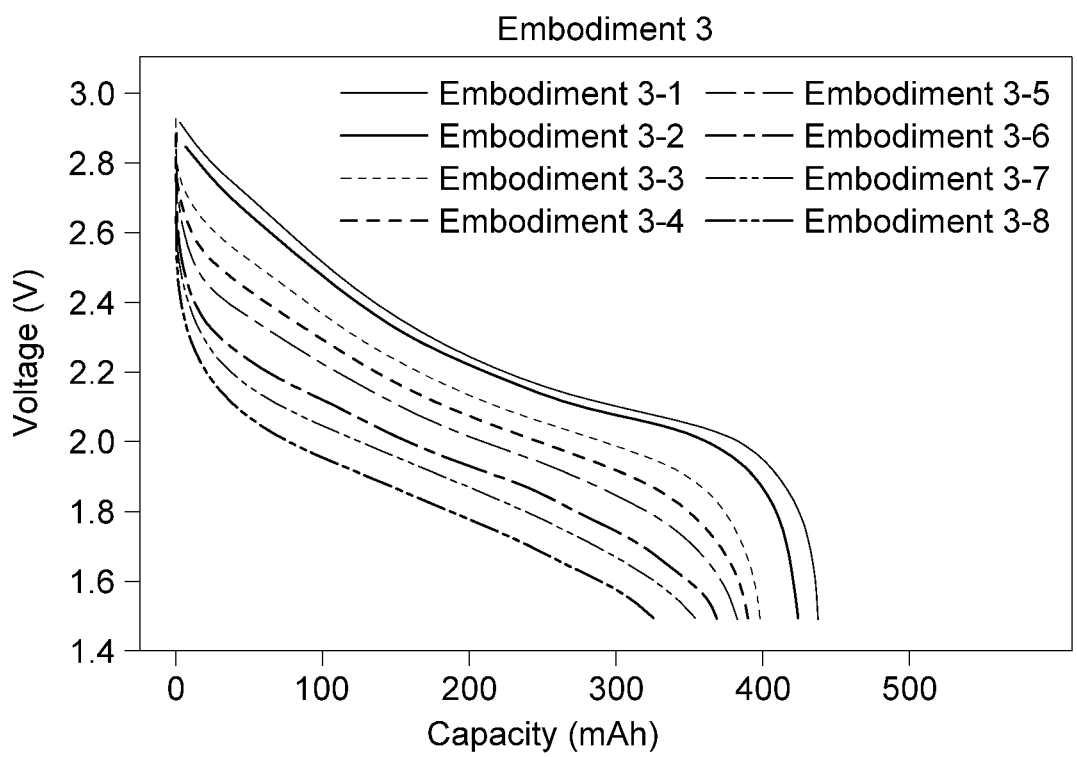
Figure 3E:
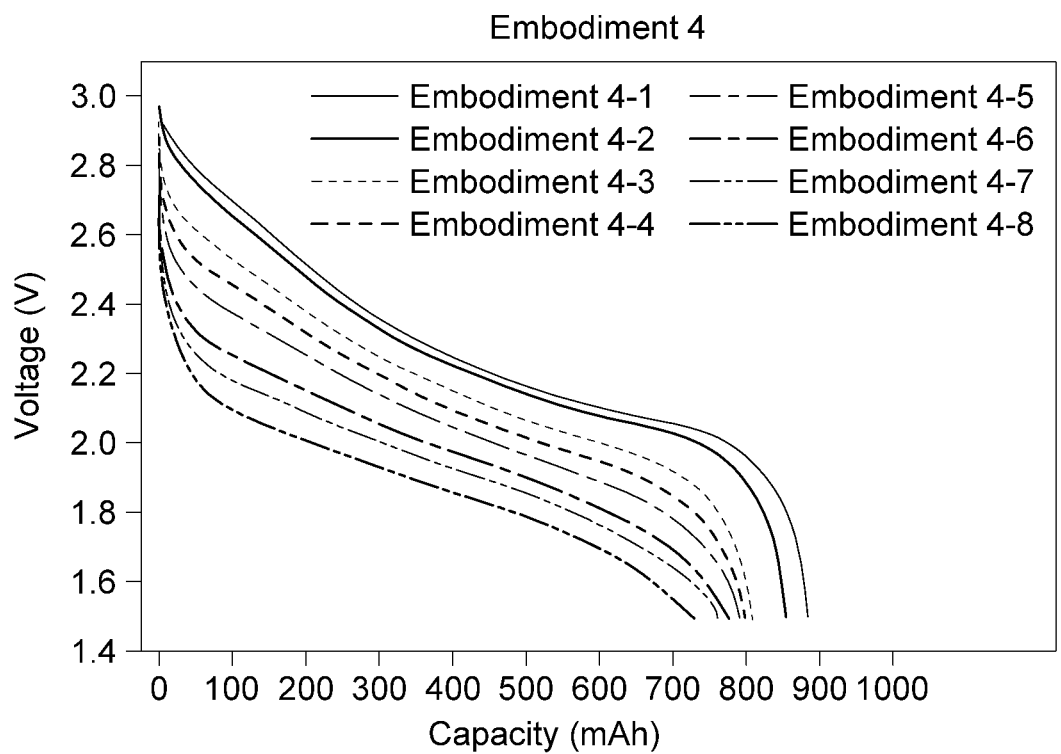
Figure 3F:
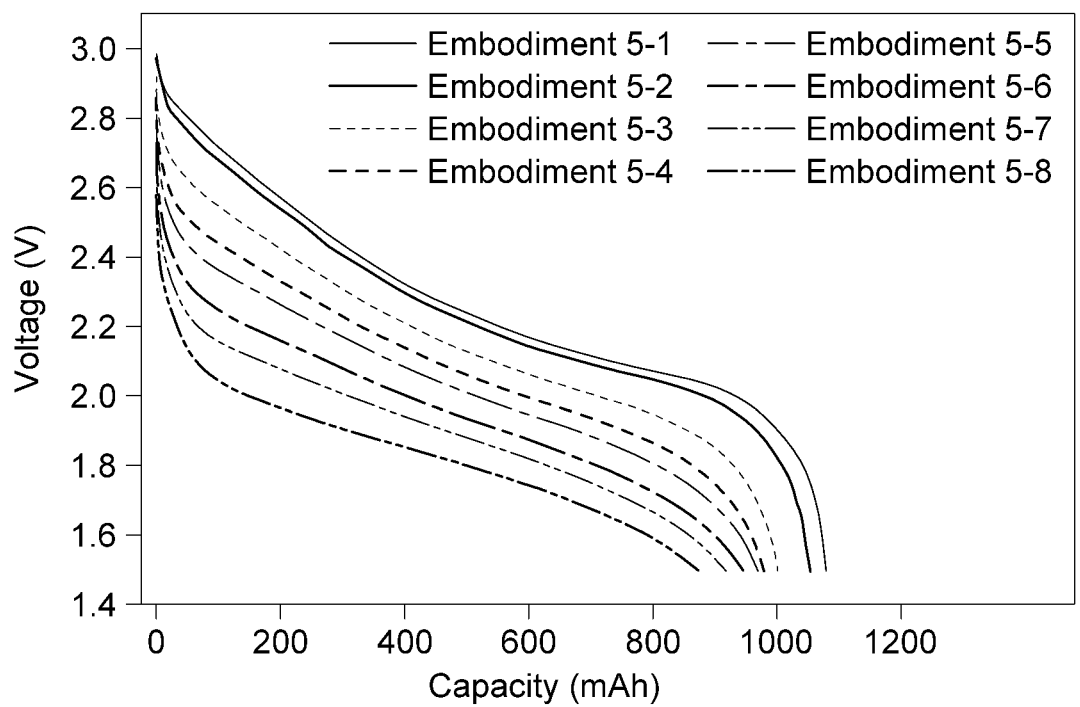
Figure 3G:
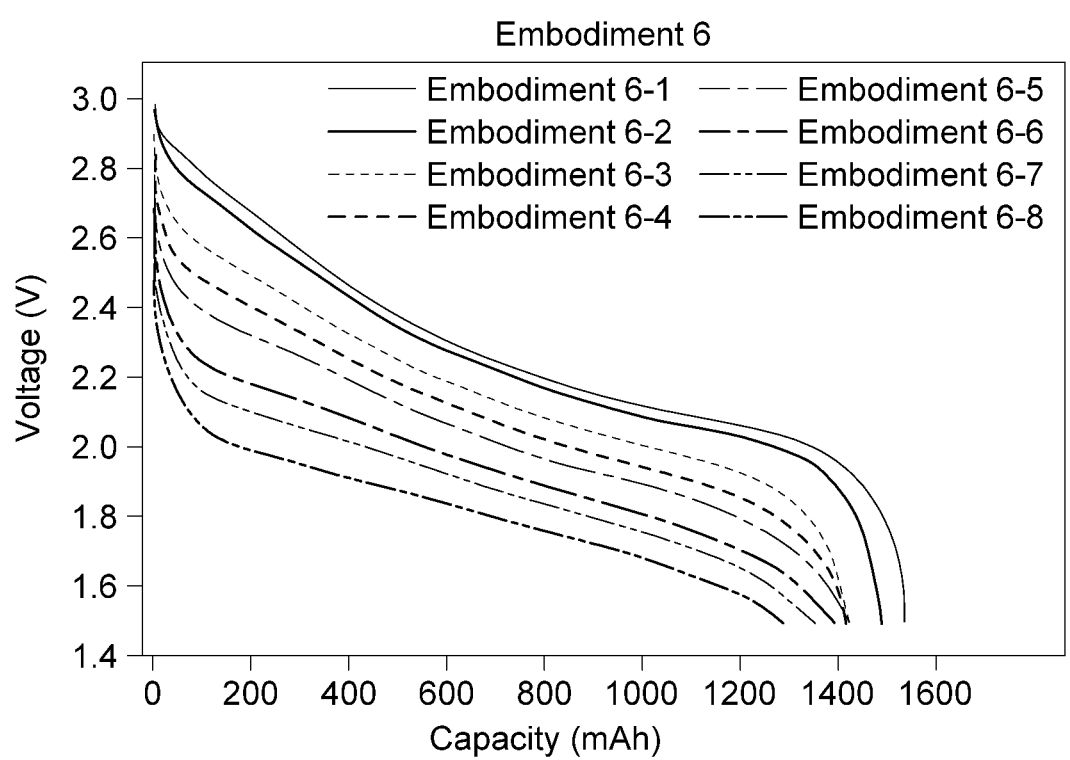

Referring to FIG. 3A, a diagram showing the results of discharging ability test performed in comparison example 1 was shown. The X-axis coordinate represented the capacity (mAh), and the Y-axis coordinate represented the voltage (V). In comparison examples 1-1 to 1-8, the same charging current (such as the charging current of 0.5 C) was used, and the battery was fully charged by constant current constant voltage (CCCV) mode, but different discharging currents (such as the discharging currents of 0.5 C to 15 C) were used in the discharging test. 0.5 C represented that, in theory, the current value adapted to discharge the fully charged battery in 2 hours. 4 C represented that, in theory, the current value adapted to discharge the fully charged cell in 0.25 (¼) hours. In other words, 4 C represented high-power discharging in comparison to 0.5 C. In comparison example 1-1, a discharging current of 0.5 C was used. In comparison example 1-2, a discharging current of 1 C was used. In comparison example 1-3, a discharging current of 3 C was used. In comparison example 1-4, a discharging current of 5 C was used. In comparison example 1-5, a discharging current of 7 C was used. In comparison example 1-6, a discharging current of 10 C was used. In comparison example 1-7, a discharging current of 12 C was used. In comparison example 1-8, a discharging current of 15 C was used.

Referring to FIGS. 3B-3G, diagrams showing the results of discharging ability test performed in embodiments 1-6 were shown. Like comparison example 1, in embodiments 1-1 to 1-8, 2-1 to 2-8, 3-1 to 3-8, 4-1 to 4-8, 5-1 to 5-8 and 6-1 to 6-8, the same charging current (such as the charging current of 0.5 C) was used, but the discharging currents (such as the discharging currents of 0.5 C to 15 C) were different. In embodiments 1-1, 2-1, 3-1, 4-1, 5-1 and 6-1, a discharging current of 0.5 C was used. In embodiments 1-2, 2-2, 3-2, 4-2, 5-2 and 6-2, a discharging current of 1 C was used. In embodiments 1-3, 2-3, 3-3, 4-3, 5-3 and 6-3, a discharging current of 3 C was used. In embodiments 1-4, 2-4, 3-4, 4-4, 5-4 and 6-4, a discharging current of 5 C was used. In embodiments 1-5, 2-5, 3-5, 4-5, 5-5 and 6-5, a discharging current of 7 C was used. In embodiments 1-6, 2-6, 3-6, 4-6, 5-6 and 6-6, a discharging current of 10 C was used. In embodiments 1-7, 2-7, 3-7, 4-7, 5-7 and 6-7, a discharging current of 12 C was used. In embodiments 1-8, 2-8, 3-8, 4-8, 5-8 and 6-8, a discharging current 15 C was used.

Figure 4A:
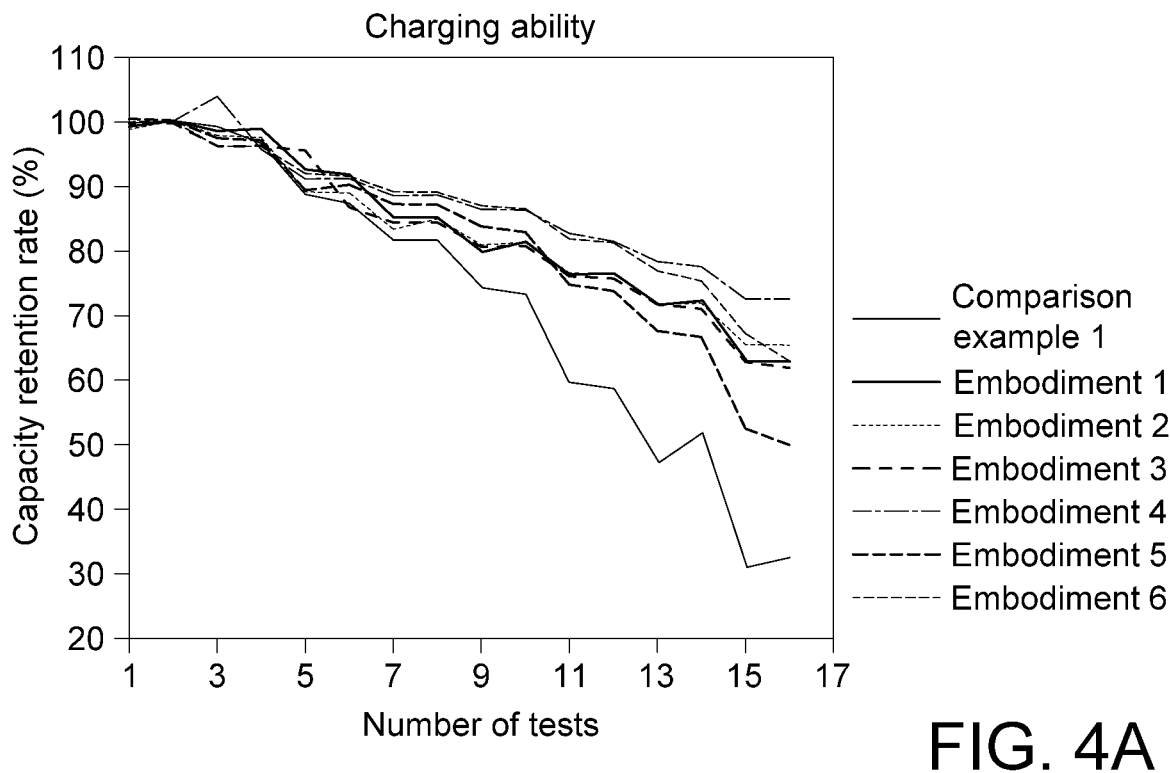
FIG. 4A is a diagram showing the capacity retention ratio obtained from the charging ability test performed in comparison example 1 and embodiments 1-6.

FIG. 4A is a diagram showing the capacity retention ratio obtained from the charging ability test performed in comparison example 1 and embodiments 1 to 6.

Referring to FIG. 4A, the X-axis coordinate represented the number of charging tests. The charging current of 0.5 C was used in the first to the second charging test. The charging current of 1 C was used in the third to the fourth charging test. The charging current of 3 C was used in the fifth to the sixth charging test. The charging current of 5 C was used in the seventh to the eighth charging test. The charging current of 7 C was used in the ninth to the tenth charging test. The charging current of 10 C was used in the eleventh to the twelfth charging test. The charging current of 12 C was used in the thirteenth to the fourteenth charging test. The charging current of 15 C was used in the fifteenth to the sixteenth charging test. The Y-axis represented the capacity retention ratio (%), particularly the capacity retention ratio calculated in comparison example 1 and embodiments 1 to 6 under different charging currents when the battery was charged by a constant current (CC) and the capacity corresponding to 0.5 C was regarded as 100%. The test result showed that under the 10 C charging condition, the capacity retention ratio in comparison example 1 was smaller than 60%, but the capacity retention ratio in embodiments 1 to 6 was greater than 70% under the 10 C charging condition. Since each ratio of the effective area of the negative active material layers to the thickness of the single side of the negative active material layers in embodiments 1 to 6 was greater than $2 \times 10^5$ mm, the battery had high-rate (such as 10 C) charging ability.

Figure 4B:
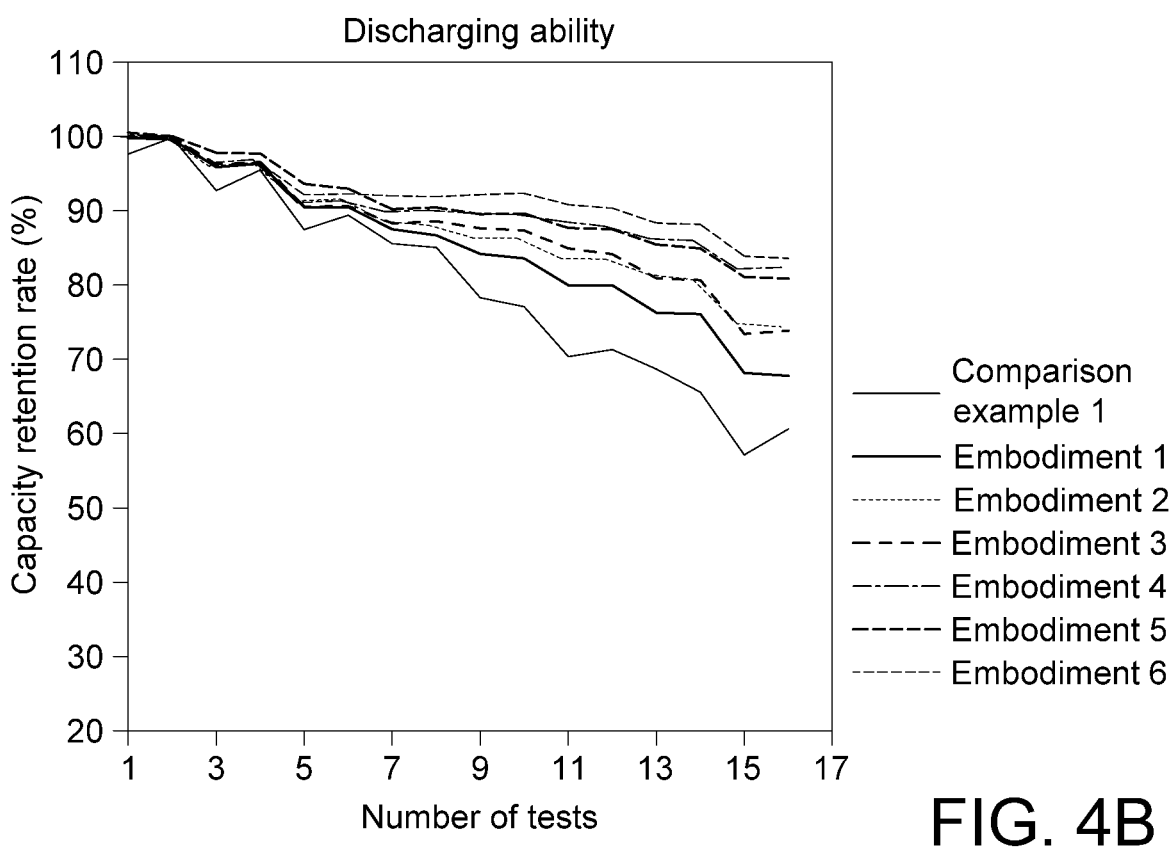
FIG. 4B is a diagram showing the capacity retention ratio obtained from the discharging ability test performed in comparison example 1 and embodiments 1-6.

FIG. 4B is a diagram showing the capacity retention ratio obtained from the discharging ability test performed in comparison example 1 and embodiments 1 to 6.

Refer to FIG. 4B. The X-axis coordinate represented the number of discharging tests. The discharging current of 0.5 C was used in the first to the second discharging test. The discharging current of 1 C was used in the third to the fourth discharging test. The discharging current of 3 C was used in the fifth to the sixth discharging test. The discharging current of 5 C was used in the seventh to the eighth discharging test. The discharging current 7 C was used in the ninth to the tenth discharging test. The discharging current of 10 C was used in the eleventh to the twelfth discharging test. The discharging current of 12 C was used in the thirteenth to the fourteenth discharging test. The discharging current of 15 C was used in the fifteenth to the sixteenth discharging test. The Y-axis represented the capacity retention ratio (%), particularly the capacity retention ratio calculated in comparison example 1 and embodiments 1 to 6 under different discharging currents when the battery was discharged by a constant current and the capacity corresponding to 0.5 C was regarded as 100%. The test result showed that under the discharging condition corresponding to 10 C, the capacity retention ratio in comparison example 1 was about 70%, but the capacity retention ratio in embodiments 1 to 6 was greater than 80%. Since all ratios of the effective area of the negative active material layers to the thickness of the single side of the negative active material layers in embodiments 1 to 6 was greater than $2 \times 10^5$ mm, the battery had high-rate (such as 10 C) discharging ability.

Figure 5A:
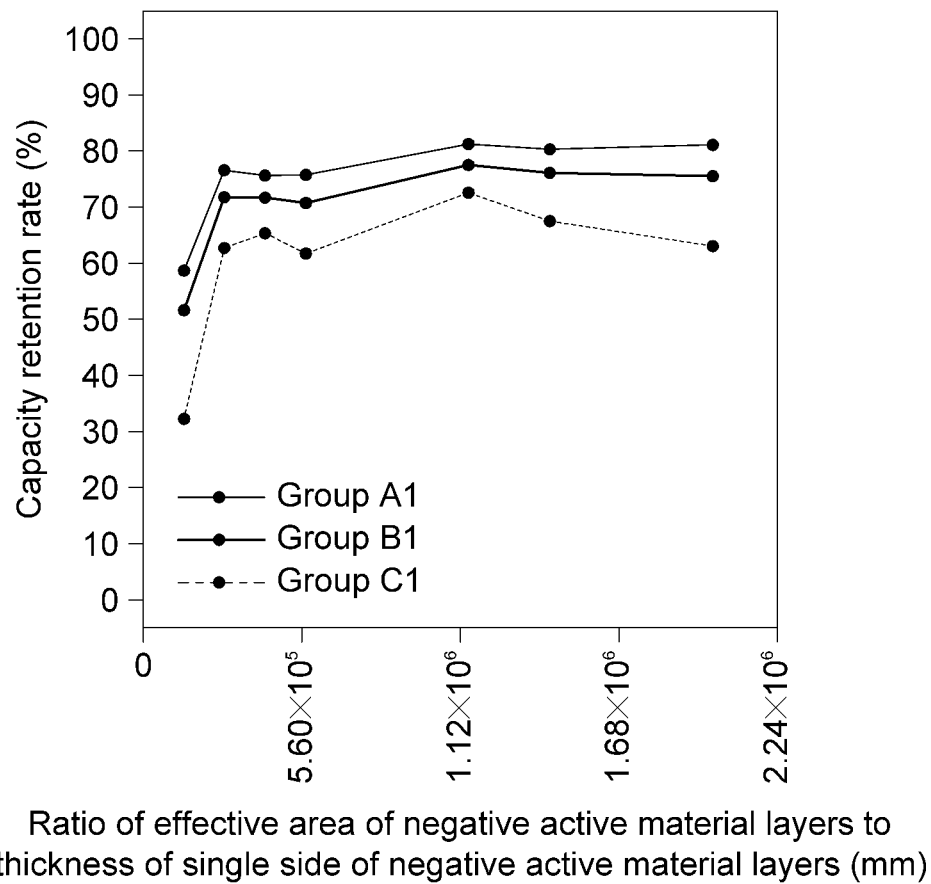
FIG. 5A is a diagram showing the capacity retention ratio obtained from the fast charging test performed in comparison example 1 and embodiments 1-6.

FIG. 5A is a diagram showing the results of capacity retention ratio obtained from the fast charging test performed in comparison example 1 and embodiments 1 to 6.

Refer to FIG. 5A. The X-axis coordinate represented the ratio of the effective area of the negative active material layers to the thickness of the single side of the negative active material layers (A/T) (mm), that is, the ratio of the effective area of the negative active material layers to the thickness of the single side of the negative active material layers in comparison example 1 and embodiments 1 to 6. The Y-axis represented the capacity retention ratio (%), particularly the capacity retention ratio in different groups when the battery was charged by a constant current and the capacity corresponding to 0.5 C was regarded as 100%. In group A1, the capacity retention ratio was obtained from the fast charging test performed in comparison example 1 and embodiments 1 to 6 when the battery was charged by the charging current of 10 C. In group B1, the capacity retention ratio was obtained from the fast charging test performed in comparison example 1 and embodiments 1 to 6 when the battery was charged by the charging current of 12 C. In group C1, the capacity retention ratio was obtained from the fast charging test performed in comparison example 1 and embodiments 1 to 6 when the battery was charged by the charging current of 15 C. The test results showed that when the ratio (A/T) of the effective area of the negative active material layers to the thickness of the single side of the negative active material layers was equivalent to or was greater than $2.87 \times 10^5$ (such as embodiments 1 to 6), the capacity retention ratio obtained in group A1 is greater than 70%, it indicated that the battery had high-rate (such as 10 C) fast charging ability.

Figure 5B:
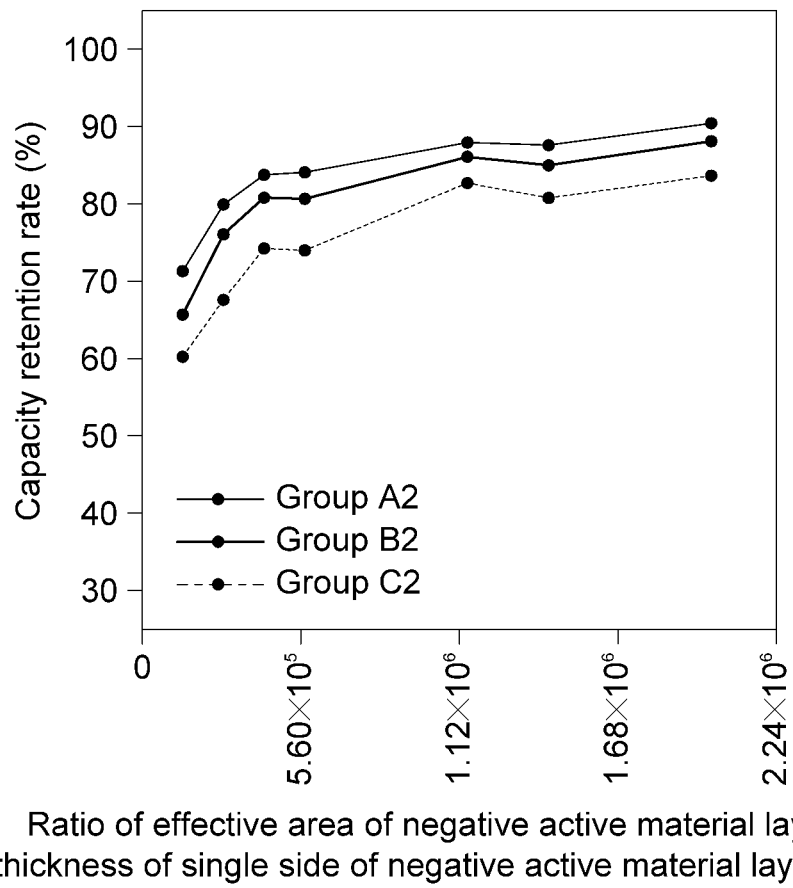
FIG. 5B is a diagram showing the capacity retention ratio obtained from the fast discharging test performed in comparison example 1 and embodiments 1-6.

FIG. 5B is a diagram showing the capacity retention ratio obtained from the fast discharging test performed in comparison example 1 and embodiments 1-6.

Refer to FIG. 5B. The X-axis coordinate represented the ratio (A/T) of the effective area of the negative active material layers to the thickness of the single side of the negative active material layers (mm), that is, the ratio of the effective area of the negative active material layers to the thickness of the single side of the negative active material layers in comparison example 1 and embodiments 1 to 6. The Y-axis represented the capacity retention ratio (%), particularly the capacity retention ratio calculated in different groups when the battery was charged by a constant current and the capacity corresponding to 0.5 C was regarded as 100%. In group A2, the capacity retention ratio was obtained from the fast discharging test performed in comparison example 1 and embodiments 1 to 6 when the battery was discharged by a discharging current of 10 C. In group B2, the capacity retention ratio was obtained from the fast discharging test performed in comparison example 1 and embodiments 1 to 6 when the battery was discharged by the discharging current of 12 C. In group C2, the capacity retention ratio was obtained from the fast discharging test performed in comparison example 1 and embodiments 1 to 6 when the battery was discharged by the discharging current of 15 C. The test results showed that when the ratio (A/T) of the effective area of the negative active material layers to the thickness of the single side of the negative active material layers was equivalent to or was greater than $2.87 \times 10^5$ (such as embodiments 1 to 6), the capacity retention ratio obtained in group A2 was greater than 80%, and it indicated that the battery had high-rate (such as 10 C) fast discharging ability.

As disclosed above, since each ratio of the effective area of the negative active material layers to the thickness (mm) of the single side of the negative active material layers (A/T) in embodiments 1 to 6 was equivalent to or was greater than $2.87 \times 10^5$, and the results of capacity retention ratio obtained from high-rate (such as 10 C) charging and discharging processes was still very high, it indicated that the battery of the disclosure had high-rate charging or discharging ability.

Comparison example 2 and embodiments 7 to 8 are mentioned below. In comparison example 2 and embodiments 7 to 8, the positive active material layers included lithium nickel cobalt manganate (for example, nickel:manganate:cobalt=1:1:1), the negative active material layers included a mixture of titanium niobium oxide (TNO) and lithium titanate (LTO) according to a weight ratio of 8:2, for example. In comparison example 2, the ratio of the effective area (A/T) of the negative active material layers to the thickness of the single side of the negative active material layers was $1.44 \times 10^5$. In embodiment 7, the ratio (A/T) of the effective area of the negative active material layers to the thickness of the single side of the negative active material layers was $2.87 \times 10^5$. In embodiment 8, the ratio (A/T) of the effective area of the negative active material layers to the thickness of the single side of the negative active material layers was $4.31 \times 10^5$. The materials of other structures of comparison example 2 and embodiments 7 to 8 were similar to the materials of other structures of comparison example 1 and embodiments 1 to 6.

Figure 6A:
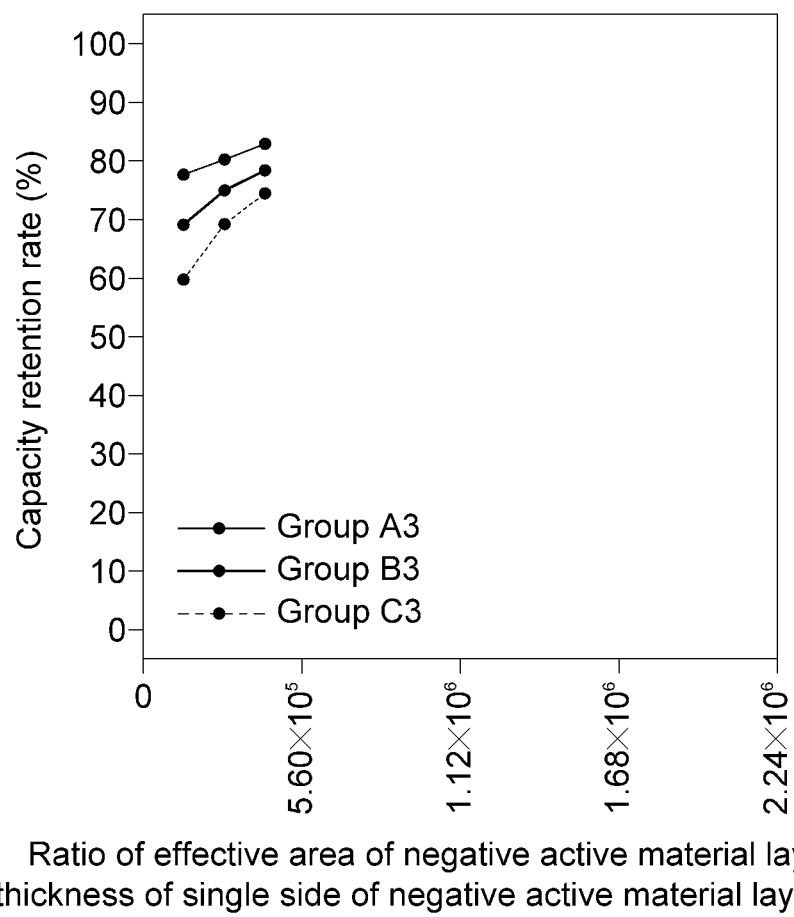
FIG. 6A is a diagram showing the capacity retention ratio obtained from the fast charging test performed in comparison example 2 and embodiments 7-8.

FIG. 6A is a diagram showing the results of capacity retention ratio obtained from the fast charging test performed in comparison example 2 and embodiments 7 to 8.

Refer to FIG. 6A. The X-axis coordinate represented the ratio (A/T) of the effective area of the negative active material layers to the thickness of the single side of the negative active material layers (mm), that is, the ratio of the effective area of the negative active material layers to the thickness of the single side of the negative active material layers in comparison example 2 and embodiments 7 to 8. The Y-axis represented the capacity retention ratio (%), particularly the capacity retention ratio calculated in different groups when the battery was charged by a constant current and the capacity corresponding to 0.5 C was regarded as 100%. In group A3, the capacity retention ratio was obtained from the fast charging test performed in comparison example 2 and embodiments 7 to 8 when the battery was charged by the charging current of 7 C. In group B3, the capacity retention ratio was obtained from the fast charging test performed in comparison example 2 and embodiments 7 to 8 when the battery was charged by the charging current of 10 C. In group C3, the capacity retention ratio was obtained from the fast charging test performed in comparison example 2 and embodiments 7 to 8 when the battery was charged by the charging current of 12 C. The test result showed that when the ratio of the effective area of the negative active material layers to the thickness of the single side of the negative active material layers (A/T) was equivalent to or was greater than $2.87 \times 10^5$ (such as embodiments 7 to 8), the capacity retention ratio obtained in group B3 was greater than 70%, and it indicated that the battery had high-rate (such as 10 C) fast charging ability.

Figure 6B:
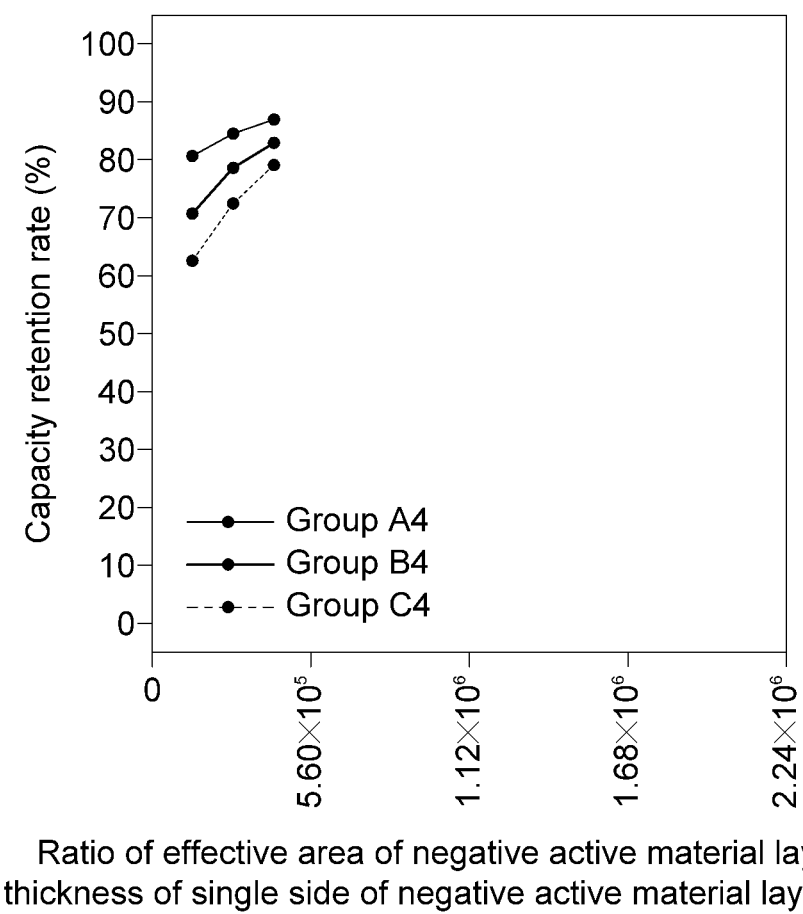
FIG. 6B is a diagram showing the capacity retention ratio obtained from the fast discharging test performed in comparison example 2 and embodiments 7-8.

FIG. 6B is a diagram showing the results of capacity retention ratio obtained from the fast discharging test performed in comparison example 2 and embodiments 7 to 8.

Refer to FIG. 6B. The X-axis coordinate represented the ratio (A/T) of the effective area of the negative active material layers to the thickness of the single side of the negative active material layers (mm), that is, the ratio of the effective area of the negative active material layers to the thickness of the single side of the negative active material layers in comparison example 2 and embodiments 7 to 8. The Y-axis represented the capacity retention ratio (%), particularly the capacity retention ratio calculated in different groups when the battery was discharged by a constant current and the capacity corresponding to 0.5 C was regarded as 100%. In group A4, the capacity retention ratio was obtained from the fast discharging test performed in comparison example 2 and embodiments 7 to 8 when the battery was discharged by the discharging current of a 7 C. In group B4, the capacity retention ratio was obtained from the fast discharging test performed in comparison example 2 and embodiments 7 to 8 when the battery was discharged by the discharging current of 10 C. In group C4, the capacity retention ratio was obtained from the fast discharging test performed in comparison example 2 and embodiments 7 to 8 when the battery was discharged by the discharging current of 12 C. The test result showed that when the ratio (A/T) of the effective area of the negative active material layers to the thickness of the single side of the negative active material layers was equivalent to or was greater than $2.87 \times 10^5$ (such as embodiments 7 to 8), the capacity retention ratio obtained in group B4 was greater than 75%, and it indicated that the battery had high-rate (such as 10 C) fast discharging ability.

As disclosed above, since each ratio (A/T) of the effective area of the negative active material layers to the thickness (mm) of the single side of the negative active material layers in embodiments 7 to 8 was equivalent to or was greater than $2.87 \times 10^5$, and the capacity retention ratio obtained from high-rate (such as 10 C) charging and discharging processes was still very high, it could be concluded that the battery of the disclosure had high-rate charging or discharging ability.

According to an embodiment of the present disclosure, a lithium-ion battery is provided. The lithium-ion battery includes a positive electrode plate, a negative electrode plate, a separator and an electrolyte. The positive electrode plate includes positive active material layers and the positive current collector, the negative electrode plate includes a negative active material layers and a negative current collector, wherein the negative active material layers include titanium niobium oxide, lithium titanate or a combination thereof. The separator is disposed between the positive electrode plate and the negative electrode plate. The electrolyte contacts the positive electrode plate and the negative electrode plate. The negative active material layers have an effective area corresponding to the positive electrode plate. The negative active material layers have a thickness on one surface of the negative current collector. A ratio of the effective area to the thickness is greater than $2 \times 10^5$ mm.

In comparison to the comparison example in which the ratio of the effective area of the negative active material layers to the thickness of the single side of the negative active material layers is smaller than $2 \times 10^5$ mm, in an embodiment of the disclosure, the ratio of the effective area of negative active material layers to the thickness of the single side of the negative active material layers is greater than $2 \times 10^5$ mm, such that the electron/ion transmission ability (that is, electrical conduction/electrochemical reaction ability) can be increased, and the lithium-ion battery can achieve a faster charging rate and a faster discharging rate. Therefore, the charging ability and the discharging ability of the lithium-ion battery can be increased, the market competitiveness of the lithium-ion battery of the disclosure can be enhanced, and the application field of the lithium-ion battery can be expanded.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:
1. A fast charging lithium-ion battery, comprising:
a positive electrode plate, comprising a positive active material layer and a positive current collector, wherein the positive active material layer essentially consists of lithium nickel cobalt manganite;
a negative electrode plate, comprising a negative active material layer and a negative current collector, wherein the negative active material layer comprises titanium niobium oxide, lithium titanate or a combination thereof;

a separator disposed between the positive electrode plate and the negative electrode plate;

an electrolyte, contacting the positive electrode plate and the negative electrode plate, wherein the negative active material layer has an effective area corresponding to and overlapping the positive electrode plate on one surface of the negative current collector, the negative active material layer has a thickness on the one surface of the negative current collector, and a ratio of the effective area to the thickness is between $2.87 \times 10^5$ mm to $2.01 \times 10^6$ mm, the thickness has a range of 38.3 μm to 100 μm.

2. The fast charging lithium-ion battery according to claim 1, wherein the negative active material layer comprises a combination of titanium niobium oxide and lithium titanate, and a weight percentage of lithium titanate to the negative active material layers is smaller than 60%.

3. The fast charging lithium-ion battery according to claim 1, wherein the negative active material layer is disposed on one surface or two surfaces of the negative current collector.

4. The fast charging lithium-ion battery according to claim 1, wherein the positive active material layer is disposed on one surface or two surfaces of the positive current collector.

* * * * *